United States Patent
Sugimori et al.

(10) Patent No.: US 10,243,205 B2
(45) Date of Patent: Mar. 26, 2019

(54) NEGATIVE ELECTRODE FOR NON-AQUEOUS ELECTROLYTE SECONDARY BATTERIES

(71) Applicant: SANYO Electric Co., Ltd., Daito-shi, Osaka (JP)

(72) Inventors: Masanori Sugimori, Hyogo (JP); Katsunori Yanagida, Hyogo (JP)

(73) Assignee: SANYO Electric Co., Ltd., Daito-shi (JP)

( * ) Notice: Subject to any disclaimer, the term of this patent is extended or adjusted under 35 U.S.C. 154(b) by 224 days.

(21) Appl. No.: 15/107,696

(22) PCT Filed: Dec. 12, 2014

(86) PCT No.: PCT/JP2014/006195
§ 371 (c)(1),
(2) Date: Jun. 23, 2016

(87) PCT Pub. No.: WO2015/098021
PCT Pub. Date: Jul. 2, 2015

(65) Prior Publication Data
US 2016/0329557 A1   Nov. 10, 2016

(30) Foreign Application Priority Data
Dec. 27, 2013 (JP) .................... 2013-271272

(51) Int. Cl.
*H01M 4/134*   (2010.01)
*H01M 4/36*    (2006.01)
(Continued)

(52) U.S. Cl.
CPC .......... *H01M 4/364* (2013.01); *H01M 4/134* (2013.01); *H01M 4/366* (2013.01); *H01M 4/386* (2013.01);
(Continued)

(58) Field of Classification Search
None
See application file for complete search history.

(56) References Cited

U.S. PATENT DOCUMENTS

| 2007/0059600 A1 | 3/2007 | Kim et al. |
| 2014/0057176 A1* | 2/2014 | Park .................. H01M 4/366 429/220 |
| 2014/0127576 A1 | 5/2014 | Kato et al. |

FOREIGN PATENT DOCUMENTS

| CN | 101969114 A | 2/2011 |
| JP | H09265976 A * | 10/1997 .............. H01M 4/13 |

(Continued)

OTHER PUBLICATIONS

JPH09265976A—Machine translation (Year: 1997).*
(Continued)

*Primary Examiner* — Sarah A. Slifka
*Assistant Examiner* — Haroon S. Sheikh
(74) *Attorney, Agent, or Firm* — Westerman, Hattori, Daniels & Adrian, LLP (57) ABSTRACT

A negative electrode for nonaqueous electrolyte secondary batteries including a negative electrode current collector and a negative electrode mixture layer placed on the negative electrode current collector. The negative electrode mixture layer is a layer of a mixture of a negative electrode active material, a binding agent, and a conductive agent. The binding agent includes a binding agent A made of a rubber polymeric compound and a binding agent B made of a water-soluble polymeric compound. In the case where a through-thickness cross section of the negative electrode mixture layer is halved into a current collector-side region and a surface-side region, the amount of the binding agent A in the current collector-side region is larger than the amount of the binding agent A in the surface-side region and
(Continued)

the amount of the conductive agent in the current collector-side region is larger than the amount of the conductive agent in the surface-side region.

10 Claims, 1 Drawing Sheet

(51) Int. Cl.
  *H01M 4/38*     (2006.01)
  *H01M 4/485*    (2010.01)
  *H01M 4/62*     (2006.01)
  *H01M 4/48*     (2010.01)
  *H01M 10/0525*  (2010.01)
  *H01M 4/02*     (2006.01)
(52) U.S. Cl.
  CPC ........... *H01M 4/483* (2013.01); *H01M 4/485* (2013.01); *H01M 4/622* (2013.01); *H01M 4/625* (2013.01); *H01M 10/0525* (2013.01); *H01M 2004/027* (2013.01)

(56) References Cited

FOREIGN PATENT DOCUMENTS

| JP | 2007-80827 A   | 3/2007  |
|----|----------------|---------|
| JP | 2008-210618 A  | 9/2008  |
| JP | 2009-289585 A  | 12/2009 |
| JP | 2011-192539 A  | 9/2011  |
| JP | 2013-137955 A  | 7/2013  |
| JP | 2013-229163 A  | 11/2013 |
| JP | 2014-120330 A  | 6/2014  |
| WO | 2013/018486 A1 | 2/2013  |
| WO | 2014/141403 A1 | 9/2014  |

OTHER PUBLICATIONS

International Search Report dated Feb. 10, 2015, issued in counterpart international application No. PCT/JP2014/006195(2pages).
English translation of Search Report dated Nov. 17, 2017, issued in counterpart Chinese Application No. 201480071051.1. (2 pages).

* cited by examiner

NEGATIVE ELECTRODE FOR NON-AQUEOUS ELECTROLYTE SECONDARY BATTERIES

TECHNICAL FIELD

The present invention relates to a negative electrode for nonaqueous electrolyte secondary batteries.

BACKGROUND ART

In recent years, smaller and lighter mobile data terminals such as mobile phones, notebook personal computers, and smartphones have been increasingly used and batteries used as driving power supplies therefor have been required to have higher capacity. Nonaqueous electrolyte secondary batteries, which are charged and discharged in such a manner that lithium ions move between positive and negative electrodes in association with charge and discharge, have high energy density and high capacity and therefore are widely used as driving power supplies for the above mobile data terminals.

Furthermore, the nonaqueous electrolyte secondary batteries are recently attracting attention as utility power supplies for electric tools, electric vehicles, and the like and applications thereof are expected to be further expanded. In such a field, high capacity and excellent power characteristics are required.

The use of, for example, a silicon-containing material as a negative electrode active material for the nonaqueous electrolyte secondary batteries is under investigation. In the case of using the silicon-containing material as an active material, although high capacity is expected, there is a problem that cycle characteristics are poor because the active material significantly expands and contracts in association with the storage and release of lithium ions during charge and discharge, the pulverization of the active material in an electrode or the isolation of the active material due to contact failures is therefore caused, and the electronic conductivity in the electrode is reduced.

Patent Literature 1 below discloses a negative electrode active material composed of cores containing a compound (where the atomic ratio x of O to the total of Si and Sn is given by $0.5 \le x \le 1.5$) containing Si or Sn and O as constituent elements and carbon cover layers covering the surfaces of the cores. It is suggested that a negative electrode can be formed by applying a negative electrode mix paste obtained by kneading a solvent and a mixture containing the negative electrode active material, a binder (binding agent), and the like to a current collector and a conductive aid may be further added to the mixture.

CITATION LIST

Patent Literature

PTL 1: Japanese Published Unexamined Patent Application No. 2008-210618

SUMMARY OF INVENTION

However, it has become apparent that a technique disclosed in Patent Literature 1 has a problem that in the case where charge and discharge are repeated, the electronic conductivity and ionic diffusivity in an electrode are reduced by the expansion and contraction of the negative electrode active material and cycle characteristics are reduced.

In order to solve the above problem, a negative electrode for nonaqueous electrolyte secondary batteries according to an aspect of the present invention includes a negative electrode current collector and a negative electrode mixture layer placed on the negative electrode current collector. The negative electrode mixture layer is a layer of a mixture of a negative electrode active material, a binding agent, and a conductive agent. The binding agent includes a binding agent A made of a rubber polymeric compound and a binding agent B made of a water-soluble polymeric compound. In the case where a through-thickness cross section of the negative electrode mixture layer is halved into a current collector-side region and a surface-side region, the amount of the binding agent A in the current collector-side region is larger than the amount of the binding agent A in the surface-side region and the amount of the conductive agent in the current collector-side region is larger than the amount of the conductive agent in the surface-side region.

According to an aspect of the present invention, the electronic conductivity and ionic diffusivity in an electrode are increased and therefore a negative electrode for nonaqueous electrolyte secondary batteries having excellent cycle characteristics is provided.

DESCRIPTION OF EMBODIMENTS

Embodiments of the present invention are described below. The embodiments are examples for carrying out the present invention. The present invention is not limited to the embodiments. Appropriate modifications can be made without departing from the scope of the present invention.

Drawings referenced in the descriptions of the embodiments are schematic. Dimensions of components illustrated in the drawings are different from those of actual components in some cases.

A nonaqueous electrolyte secondary battery using a negative electrode which is an example of an embodiment of the present invention includes a positive electrode, the negative electrode, and a nonaqueous electrolyte. A separator is preferably placed between the positive electrode and the negative electrode. An example of the nonaqueous electrolyte secondary battery is, but is not limited to, a configuration in which, for example, an electrode assembly including a positive electrode and negative electrode wound or stacked with a separator therebetween and a nonaqueous electrolyte solution that is a liquid nonaqueous electrolyte are housed in a battery enclosure can. Components of the nonaqueous electrolyte secondary battery, which is an example of this embodiment, are described below.

[Negative Electrode]

The negative electrode, which is an example of this embodiment, includes a negative electrode current collector and negative electrode mixture layers placed on the negative electrode current collector. The negative electrode mixture layers are layers of a mixture of a negative electrode active material, a binding agent, and a conductive agent. The binding agent includes a binding agent A made of a rubber polymeric compound and a binding agent B made of a water-soluble polymeric compound. In the case where a through-thickness cross section of each negative electrode mixture layer is halved into a current collector-side region and a surface-side region, the amount of the binding agent A in the current collector-side region is larger than the amount of the binding agent A in the surface-side region and the amount of the conductive agent in the current collector-side region is larger than the amount of the conductive agent in the surface-side region. The binding agent B is preferably present in the vicinity of the negative electrode active material.

In the negative electrode, which is an example of this embodiment, a larger amount of the binding agent and a larger amount of the conductive agent are placed in the current collector-side region and a smaller amount of the binding agent and a smaller amount of the conductive agent are placed in the surface-side region. Therefore, the electronic conductivity, which is likely to be reduced by the expansion and contraction of the negative electrode active material, on the electrode current collector side and the ionic diffusivity in an electrode can be increased and the charge/discharge reaction of the negative electrode active material can be equalized on the electrode current collector side and the electrode surface side. This provides a negative electrode for nonaqueous electrolyte secondary batteries having excellent cycle characteristics. Since the charge/discharge reaction of the negative electrode active material can be equalized on the electrode current collector side and the electrode surface side and a smaller amount of the conductive agent is placed in the surface-side region, a side reaction between the conductive agent and an electrolyte solution can be suppressed on the electrode surface side and therefore a negative electrode for nonaqueous electrolyte secondary batteries having excellent power characteristics after cycles is provided. The reason why such a negative electrode is obtained is probably as described below.

According to the above configuration, since a larger amount of the conductive agent and a larger amount of the binding agent A are placed on the current collector side of the negative electrode mixture layer, the conductive agent and binding agent A placed on the current collector side are intertwined with each other and are dispersed. This suppresses that the binding agent A agglomerates on the current collector side to serve as a resistor and the migration of electrons is inhibited. Therefore, the electronic conductivity (the migration of electrons) on the current collector side can probably be increased.

Since the conductive agent and the binding agent A are intertwined with each other and are dispersed on the current collector side, a phenomenon (migration) that the binding agent A migrates to the surface side during the application and drying of mixture slurry is suppressed and therefore the binding agent A, which has liquid-holding ability, can be held on the current collector side. This probably enables the ionic diffusivity (the migration of lithium ions) on the current collector side to be increased because the performance of holding the electrolyte solution, which is likely to be short on the current collector side, can be increased even in such a state that the negative electrode active material expands in association with charge and discharge to reduce the amount of cavities in the electrode. In addition, in the above configuration, a smaller amount of the conductive agent and a smaller amount of the binding agent A are placed on the surface side. Therefore, it is conceivable that the permeability of the electrolyte solution in a thickness direction of the electrode can be increased and the ionic diffusivity (the migration of lithium ions) in the electrode can be increased. These ensure migration paths of lithium ions in the electrode.

That is, since the electronic conductivity on the current collector side is increased and the ionic diffusivity in the electrode is increased as described above, both of the migration of electrons and the migration of lithium ions are smooth. Therefore, it is conceivable that the charge/discharge reaction of the negative electrode active material can be equalized on the electrode current collector side and the electrode surface side and cycle characteristics and power characteristics after cycles are enhanced. In the above configuration, since a smaller amount of the conductive agent is placed on the surface side, the side reaction between the conductive agent and the electrolyte solution on the electrode surface side is suppressed and therefore power characteristics after cycles are probably enhanced.

In the above configuration, when the amount of each of the conductive agent and binding agent A placed on the current collector side is the same as the amount of each of the conductive agent and binding agent A placed on the surface side, the percentage of each of the conductive agent and the binding agent in the electrode is too large and therefore the capacity is low. Furthermore, in this case, the charge/discharge reaction of the negative electrode active material becomes uneven on the electrode current collector side and the electrode surface side and therefore cycle characteristics and power characteristics after cycles are reduced.

Figure 1:
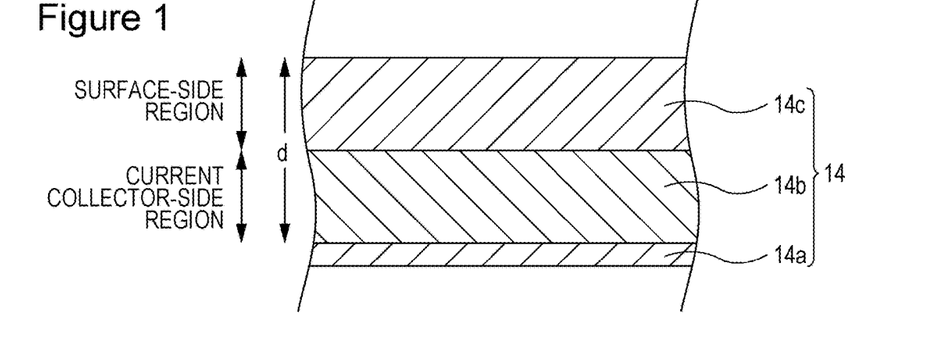
FIG. 1 is an enlarged schematic sectional view of a portion of a negative electrode which is an example of an embodiment of the present invention.

As shown in FIG. 1, the negative electrode 14 is preferably composed of the negative electrode current collector 14a, first negative electrode mix sub-layers 14b placed on the negative electrode current collector, and second negative electrode mix sub-layers 14c each placed on a corresponding one of the first negative electrode mix sub-layers. In this embodiment, the negative electrode mixture layer is composed of two sub-layers as described above. The negative electrode mixture layer may be composed of a plurality of sub-layers.

The expression "a through-thickness cross section of each negative electrode mixture layer is halved into a current collector-side region and a surface-side region" means that when a direction in which the negative electrode current collector 14a and the negative electrode mixture layer (the first negative electrode mix sub-layer 14b and the second negative electrode mix sub-layer 14c) are stacked is defined as a thickness direction of the negative electrode mixture layer, the through-thickness cross section of the negative electrode mixture layer is halved at an intermediate point in the thickness d of the negative electrode mixture layer. In the halved through-thickness cross section, a cross section of the mixture layer that is located close to the current collector is defined as the current collector-side region and a cross section of the mixture layer that is located far away from the current collector is defined as the surface-side region.

A specific method by which the amount of the binding agent A in the current collector-side region is adjusted above the amount of the binding agent A in the surface-side region and the amount of the conductive agent in the current collector-side region is adjusted above the amount of the conductive agent in the surface-side region is described below. For example, current collector-side negative electrode mixture slurry is prepared by mixing the negative electrode active material, a larger amount of the binding agent A than that on the surface side, the same amount of the binding agent B as that on the surface side, a larger amount of the conductive agent than that on the surface side, and a solvent such as water together. Separately, surface-side negative electrode mixture slurry is prepared by mixing the negative electrode active material, a smaller amount of the binding agent A than that on the current collector side, the same amount of the binding agent B as that on the current collector side, a smaller amount of the conductive agent than that on the current collector side, and a solvent such as water together. The current collector-side negative electrode mixture slurry is applied to both surfaces of the negative electrode current collector and is then dried. Thereafter, the surface-side negative electrode mixture slurry is applied to layers of the current collector-side negative electrode mixture slurry and is then dried, whereby the negative electrode mixture layers can be formed. Incidentally, the amount of the binding agent B on the surface side may be different from the amount of the binding agent B on the current collector side.

In the above method, after the current collector-side negative electrode mixture slurry is applied and is then dried, the surface-side negative electrode mixture slurry is applied. The following method may be used: a method in which after the current collector-side negative electrode mixture slurry is applied, the surface-side negative electrode mixture slurry is applied before the current collector-side negative electrode mixture slurry is dried out. In the case of using the latter method, the following layer is likely to be formed: a mixture layer in which the current collector-side negative electrode mixture slurry and the surface-side negative electrode mixture slurry are mixed with each other. In the former method, the amounts of the binding agents A and B vary discontinuously. However, in the latter method, the amounts of the binding agents A and B vary continuously.

The negative electrode active material is not particularly limited and may be one capable of reversibly storing and releasing lithium. The negative electrode active material used may be, for example, a carbon material, a metal alloying with lithium, an alloy material alloying with lithium, a metal oxide, or the like.

The negative electrode active material preferably contains silicon. When the negative electrode active material contains silicon, the change in volume of the active material due to charge and discharge is larger as compared to when the negative electrode active material used is the carbon material only and the amount of cavities in the electrode is significantly reduced because the negative electrode active material, which contains silicon, expands in association with charge and discharge. Therefore, the electrolyte solution is likely to be short on the current collector side. Thus, the effect of enhancing cycle characteristics and power characteristics after cycles by equalizing the charge/discharge reaction of the negative electrode active material on the current collector side and the surface side is probably further exhibited when the negative electrode active material contains silicon. Furthermore, when the negative electrode active material contains silicon, higher capacity can be achieved as compared to when the negative electrode active material used is the carbon material only.

Furthermore, when the negative electrode active material contains silicon and the charge/discharge reaction of the negative electrode active material is even on the current collector side and the surface side, the increase of the rate of increase in resistance (rate of increase in DCIR) is suppressed. This probably enables power characteristics after cycles to be enhanced.

The effect of suppressing the increase of resistance is further exhibited when the negative electrode active material contains silicon as compared to when the negative electrode active material is the carbon material only. When the negative electrode active material used is the carbon material only, it is known that whether the conductive agent is added or is placed hardly affects the change in resistance due to the negative electrode. This is probably because when the negative electrode active material used is the carbon material only, the expansion and contraction of the negative electrode active material in association with charge and discharge are smaller as compared to when the negative electrode active material contains silicon and the charge/discharge reaction of the negative electrode active material in the electrode is unlikely to be uneven.

The silicon-containing material is, for example, at least one selected from the group consisting of silicon particles, silicon alloy particles, and silicon compound particles.

Examples of a silicon alloy include solid solutions of silicon and one or more other elements, intermetallic compounds of silicon and one or more other elements, and eutectic alloys of silicon and one or more other elements. Examples of a method for synthesizing an alloy include an arc melting method, a liquid quenching method, a mechanical alloying method, a sputtering method, a chemical vapor deposition method, and a calcination method. In particular, examples of the liquid quenching method include various atomizing methods such as a single-roll quenching method, a twin-roll quenching method, a gas atomizing method, a water atomizing method, and a disk atomizing method.

The silicon compound particles are not particularly limited and may be a compound containing silicon. The silicon compound particles are preferably a compound containing silicon and oxygen. Such a compound is a silicon oxide (the atomic ratio x of oxygen to the total amount of silicon is given by $0.5 \leq x \leq 1.5$).

The silicon oxide is preferably surface-coated with amorphous carbon. The silicon oxide has high electronic resistance and therefore reduces load characteristics. Surface-coating the silicon oxide with amorphous carbon enables electronic conductivity to be imparted to the silicon oxide, thereby enabling the conductivity of a mixture layer to be increased.

The negative electrode active material preferably further contains a carbon material. The carbon material is not particularly limited and may be one capable of reversibly storing and releasing lithium. Graphite including natural graphite, non-graphitizable carbon, and artificial graphite can be used. In this case, the content of the silicon-containing material present in each negative electrode mixture layer is preferably 1% to 50% by mass and more preferably 1% to 20% by mass with respect to the total amount (the sum of the amount of the carbon material and the amount of the silicon-containing material) of the negative electrode active material present in the negative electrode mixture. This is because when the content of the silicon-containing material is more than 50% by mass, the influence of the expansion and contraction of the silicon-containing material is too large and because when the content of the silicon-containing material is less than 1% by mass, the effect of increasing the capacity of a battery is unlikely to be obtained.

A larger amount of the silicon-containing material, as well as the conductive agent, is preferably placed on the current collector side rather than the surface side. For example, the content of the silicon-containing material present in the current collector-side region is 50% to 100% by mass with respect to the amount of silicon present in the negative electrode mixture. The current collector side has the high performance of holding the electrolyte solution and high electronic conductivity due to effects of the conductive agent and the binding agent A. Since the amounts of the conductive agent and binding agent A on the surface side are small, the migration of lithium ions to the current collector side is unlikely to be blocked. Thus, when the amount of the silicon-containing material on the current collector side is large, the unevenness in reaction between the surface side and the current collector side can be reduced.

The conductive agent used may be, for example, a carbonaceous conductive agent. Examples of the carbonaceous conductive agent include carbon blacks such as furnace black, acetylene black, and Ketjenblack and graphite. The conductive agent preferably has an average particle size of 0.0001 μm to 30 μm, more preferably 0.001 μm to 10 μm, and particularly preferably 0.01 μm to 1 μm. This is because when the average particle size is too large, the diffusion of lithium ions is likely to be inhibited and an effect of this configuration is unlikely to be obtained and because when the average particle size is too small, oil absorption increases due to an increase in specific surface area, the amount of solid matter in mixture slurry is unlikely to be increased, and therefore a problem that productivity is poor is likely to occur.

The conductive agent used may be fibrous carbon including carbon fibers and carbon nanotubes in addition to those described above.

The content of the conductive agent in the negative electrode mixture layer is preferably 0.1% to 20% by mass and more preferably 0.1% to 6% by mass from the viewpoint of high capacity. This is because when the content of the conductive agent less than 0.1% by mass, the effect of increasing the electronic conductivity and ionic diffusivity in the electrode is not sufficiently obtained and because when the content of the conductive agent more than 20% by mass, a problem with a reduction in battery capacity occurs.

The binding agent A, which contains the rubber polymeric compound, is not particularly limited and may be an elastic polymeric compound. Examples of the binding agent A include rubber binders such as styrene-butadiene rubber, high styrene rubber, ethylene-propylene rubber, butyl rubber, chloroprene rubber, butadiene rubber, isoprene rubber, acrylonitrile-butadiene rubber, acrylonitrile rubber, fluororubber, acrylic rubber, and silicone rubber. The rubber binders may be used alone or in combination.

The percentage of the binding agent A in the negative electrode mixture layer is preferably 0.5% to 2% by mass. The amount of the binding agent A present in the current collector-side region is preferably 50% to 70% of the amount of the binding agent A present in the negative electrode mixture layer. This is because when the amount of the binding agent A on the current collector side is large, there is an excellent effect that adhesion properties and the performance of holding the electrolyte solution are enhanced and because when the amount of the binding agent A on the surface side is too small, lithium ions are likely to migrate during rest and therefore a problem that self-discharge proceeds is likely to occur.

The binding agent A has a property that the binding agent rises into the surface-side region of the electrode together with a solvent in the course of drying negative electrode mixture slurry and is unevenly distributed in the surface-side region after drying. The amount of the binding agent A in the current collector-side region after drying can be adjusted within the above range in such a manner that a larger amount of the binding agent A is charged in the current collector-side region in advance.

A method for determining the binding agent A is a method in which a cross section is prepared with a cross section polisher, is dyed with osmium tetroxide, and is then analyzed with an electron probe microanalyzer (abbreviated as EPMA) or an energy dispersive X-ray spectroscopy (abbreviated as EDX or EDS) or a similar method.

The binding agent B, which contains the water-soluble polymeric compound, is not particularly limited and may be a polymeric compound which is water-soluble. Polymer-based water-soluble polymeric compounds (hereinafter referred to as the "polymer-based compounds") and polysaccharide-based water-soluble polymeric compounds (hereinafter referred to as the "polysaccharide-based compounds") may be used alone or in combination. The polymer-based compounds used may be polyvinyl alcohol, polyvinylpyrrolidone, polyethylene oxide, and derivatives thereof. The polysaccharide-based compounds used may be cellulose, carboxymethylcellulose, and the like. In particular, carboxymethylcellulose is preferable from the viewpoint of electrochemical stability and the like. The percentage of the binding agent B in the negative electrode mixture layer is preferably 0.5% to 2% by mass.

In order to ensure the adhesion of the negative electrode active material in the negative electrode mixture layer and in order to substantially evenly form a SEI (solid electrolyte interface) coating, the binding agent B is preferably present in the vicinity of the negative electrode active material.

The negative electrode mixture slurry used may be aqueous negative electrode mixture slurry prepared by mixing a binding agent such as styrene-butadiene rubber with a solvent such as water or nonaqueous negative electrode mixture slurry prepared by mixing a binding agent such as PVdF with a nonaqueous solvent. In the case where an active material, such as the silicon-containing material, expanding and contracting significantly is mixed, the aqueous negative electrode mixture slurry is preferably used because a large amount of the binding agent needs to be added in order to ensure current collection properties and therefore high capacity is unlikely to be achieved using the nonaqueous negative electrode mixture slurry.

[Positive Electrode]

The positive electrode is not particularly limited and may be one capable of being used as a positive electrode for nonaqueous electrolyte secondary batteries. A positive electrode active material is a lithium-transition metal composite oxide containing a transition metal such as cobalt, nickel, manganese, or aluminium or a similar oxide. Examples of a lithium transition metal composite oxide containing nickel and manganese include lithium-nickel composite oxides, lithium-nickel-cobalt composite oxides, lithium-nickel-cobalt-aluminium composite oxides, and lithium-nickel-cobalt-manganese composite oxides.

The type of the lithium-transition metal composite oxide is not limited to those described above. The lithium-transition metal composite oxide may be one, having an olivine structure, represented by the formula $LiMePO_4$ (where Me is at least one selected from the group consisting of Fe, Ni, Co, and Mn); one, having a spinel structure, represented by the formula $LiMe_2O_4$ (where Me is at least one selected from the group consisting of Fe, Ni, Co, and Mn); or the like. The lithium-transition metal composite oxide may further contain at least one selected from the group consisting of magnesium, aluminium, titanium, chromium, vanadium, iron, copper, zinc, niobium, molybdenum, zirconium, tin, tungsten, sodium, and potassium.

[Nonaqueous Electrolyte]

A solvent for the negative electrode is not particularly limited and may be one conventionally used in nonaqueous electrolyte secondary batteries. For example, the following compounds can be used: cyclic carbonates such as ethylene carbonate, propylene carbonate, and butylene carbonate, and vinylene carbonate; linear carbonates such as dimethyl carbonate, ethyl methyl carbonate, and diethyl carbonate; compounds including esters such as methyl acetate, ethyl acetate, propyl acetate, methyl propionate, ethyl propionate, and γ-butyrolactone; sulfo group-containing compounds such as propanesulfone; compounds including ethers such as 1,2-dimethoxyethane, 1,2-diethoxyethane, tetrahydrofuran, 1,2-dioxane, 1,4-dioxane, and 2-methyltetrahydrofuran; compounds including nitriles such as butyronitrile, valeronitrile, n-heptanenitrile, succinonitrile, glutaronitrile, adiponitrile, pimelonitrile, 1,2,3-propanetricarbonitrile, and 1,3,5-pentanetricarbonitrile; and compounds including amides such as dimethylformamide. In particular, solvents obtained by partly substituting H in these compounds with F are preferably used. These compounds may be used alone or in combination. The following solvents are particularly preferable: a solvent which is a combination of a cyclic carbonate and a linear carbonate and a solvent which is a combination of these cyclic and linear carbonates, small amounts of compounds including nitriles, and small amounts of compounds including ethers.

An ionic liquid can be used as a nonaqueous solvent for the nonaqueous electrolyte. In this case, a cationic species and an anionic species are not particularly limited. A combination of a cation such as a pyridinium cation, an imidazolium cation, or a quaternary ammonium cation and an anion such as a fluorine-containing imide anion is particularly preferable from the viewpoint of low viscosity, electrochemical stability, hydrophobicity, and the like.

Furthermore, a known lithium salt conventionally used in nonaqueous electrolyte secondary batteries can be used as a solute for the nonaqueous electrolyte. The lithium salt used may be one containing at least one selected from the group consisting of P, B, F, O, S, N, and Cl. In particular, the following slats and mixtures can be used: lithium salts such as $LiPF_6$, $LiBF_4$, $LiCF_3SO_3$, $LiN(FSO_2)_2$, $LiN(CF_3SO_2)_2$, $LiN(C_2F_5SO_2)_2$, $LiN(CF_3SO_2)(C_4F_9SO_2)$, $LiC(C_2F_5SO_2)_3$, $LiAsF_6$, and $LiClO_4$ and mixtures of these salts. In particular, $LiPF_6$ is preferably used in order to enhance the durability and high-rate charge/discharge characteristics of the nonaqueous electrolyte secondary battery.

[Others]

A separator used may be one conventionally used. In particular, a separator containing polyethylene, a separator including a polypropylene-containing layer formed on polyethylene, or a polyethylene separator surface-coated with an aramid resin or the like may be used.

Layers containing inorganic filler conventionally used may be formed between the positive electrode and the separator and between the negative electrode and the separator. The filler used may be an oxide, containing one or some of titanium, aluminium, silicon, and magnesium, conventionally used; a phosphoric acid compound, containing one or some of titanium, aluminium, silicon, and magnesium, conventionally used; or one surface-treated with a hydroxide or the like. The filler layers can be formed in such a manner that filler-containing slurry is directly applied to the positive electrode, the negative electrode, or the separator; in such a manner that a sheet formed from the filler is attached to the positive electrode, the negative electrode, or the separator; or in a similar manner.

EXAMPLES

Examples of the present invention are described below in detail with reference to experiment examples. The present invention is not limited to the experiment examples. Appropriate modifications can be made without departing from the scope of the present invention.

Experiment Example 1

[Preparation of Negative Electrode]

The following materials were mixed together: as a negative electrode active material, 95 mass parts of a graphite powder, 5 mass parts of $SiO_x$ (x=1) having a carbon coating layer, 1 mass part of carboxymethylcellulose (CMC) corresponding to a binding agent B, and water. The mixture was mixed with 1.5 mass parts of styrene-butadiene rubber (SBR) corresponding to a binding agent A and water, whereby negative electrode mixture slurry (1) was prepared. That is, the mass ratio of the negative electrode active material to CMC to SBR was 100:1:1.5.

Furthermore, the following materials were mixed together: 95 mass parts of the graphite powder, 5 mass parts of $SiO_x$ (x=1) having a carbon coating layer, 1 mass part of carboxymethylcellulose (CMC) corresponding to the binding agent B, and water. The mixture was mixed with 0.5 mass parts of styrene-butadiene rubber (SBR) corresponding to the binding agent A and water, whereby negative electrode mixture slurry (2) was prepared. That is, the mass ratio of the negative electrode active material to CMC to SBR was 100:1:0.5.

Next, as shown in FIG. 1, the negative electrode mixture slurry (1) was applied to both surfaces of a negative electrode current collector 14a (refer to FIG. 1) made of copper foil with a thickness of 8 μm and was dried, whereby first negative electrode mixture sub-layers 14b were formed. Thereafter, the negative electrode mixture slurry (2) was applied to both surfaces of layers of the negative electrode mixture slurry (1) and was dried, whereby second negative electrode mixture sub-layers 14c were formed.

In this operation, the mass of the negative electrode active material contained in the layers of the negative electrode mixture slurry (1) was the same as the mass of the negative electrode active material contained in layers of the negative electrode mixture slurry (2). The amount of a mix applied to both surfaces was 282 g/m² in total.

Rolling was performed using a rolling roller such that the thickness of an electrode plate was 175 μm and a predetermined electrode size was cut out, whereby a negative electrode was prepared.

[Preparation of Positive Electrode]

With 100 parts by mass of particles of lithium nickel cobalt aluminium oxide represented by $LiNi_{0.82}Co_{0.15}Al_{0.03}O_2$, 0.8 parts by mass of carbon black serving as a carbon conductive agent and 0.7 parts by mass of polyvinylidene fluoride serving as a binding agent were mixed, followed by adding an appropriate amount of NMP (N-methyl-2-pyrrolidone), whereby positive electrode mixture slurry was prepared. Next, the positive electrode mixture slurry was applied to both surfaces of a positive electrode current collector, containing aluminium, having a thickness of 15 μm and was dried. The amount of a mixture applied to both surfaces was 578 g/m² in total. Rolling was performed using a rolling roller such that the thickness of an electrode plate was 164 μm and a predetermined electrode size was cut out, whereby a positive electrode was prepared.

[Preparation of Electrode Assembly]

The single positive electrode, the single metal element, and two separators including a microporous membrane made of polyethylene were used to prepare a flat wound electrode assembly. First, the positive electrode and the negative electrode were placed opposite each other in such a state that the positive electrode and the negative electrode were insulated from each other with the separators. Next, the positive electrode, the negative electrode, and the separators were spirally wound around a cylindrical winding core. In this operation, a positive electrode current-collecting tab and a negative electrode current-collecting tab were arranged so as to be located at the outermost edge of each electrode. Thereafter, a wound electrode assembly was prepared by drawing out the winding core and was then crushed, whereby the flat wound electrode assembly was obtained. The flat wound electrode assembly has a structure in which the positive electrode and the negative electrode are stacked with the separators therebetween.

[Preparation of Nonaqueous Electrolyte Solution]

To a solvent mixture of EC (ethylene carbonate), DMC (dimethyl carbonate), and EMC (ethyl methyl carbonate) mixed at a volume ratio of 20:60:20, 3% by mass of VC (vinylene carbonate) was added, followed by dissolving 1.3 moles per liter of $LiPF_6$ serving as a solute, whereby a nonaqueous electrolyte solution was prepared.

[Preparation of Battery]

Figure 2:
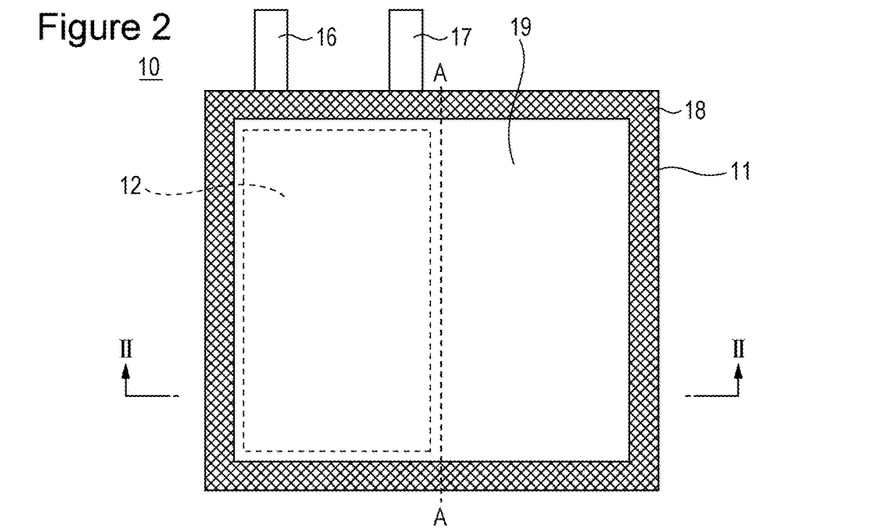
FIG. 2 is a schematic plan view of a nonaqueous electrolyte secondary battery which is an example of an embodiment of the present invention.
Figure 3:
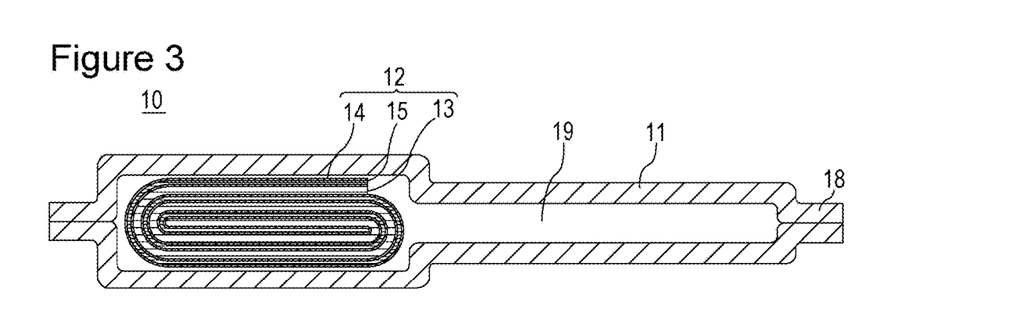
FIG. 3 is a schematic sectional view showing a cross section taken along the line II-II of FIG. 1.

The nonaqueous electrolyte solution prepared as described above and the flat wound electrode assembly were provided in a laminate enclosure 11 made of aluminium in a glove box under an argon atmosphere, whereby a laminate-type nonaqueous electrolyte secondary battery 10 having a structure shown in FIGS. 2 and 3, a thickness d of 3.6 nm, a width of 3.5 cm, and a length of 6.2 cm was prepared. A nonaqueous electrolyte secondary battery according to Experiment Example 1 had a design capacity of 1,250 mAh as determined by charging the battery to a voltage of 4.2 V. The battery prepared as described above is hereinafter referred to as Battery A1.

The structure of the nonaqueous electrolyte secondary battery 10, which was prepared in Experiment Example 1, is described with reference to FIGS. 2 and 3. The nonaqueous electrolyte secondary battery 10 includes the laminate enclosure 11 covering the periphery, the flat wound electrode assembly 12, and the nonaqueous electrolyte solution. The wound electrode assembly 12 is flat and has a configuration in which the positive electrode 13 and the negative electrode 14 are wound in such a state that the positive electrode 13 and the negative electrode 14 are insulated from each other with the separators 15. The positive electrode current-collecting tab 16 is connected to the positive electrode 13 of the wound electrode assembly 12. Likewise, the negative electrode current-collecting tab 17 is connected to the negative electrode 14. The wound electrode assembly 12 is sealed in the laminate enclosure 11, which covers the periphery, together with the nonaqueous electrolyte solution. An outer peripheral portion of the laminate enclosure 11 is hermetically sealed with a heat seal portion 18.

In the nonaqueous electrolyte secondary battery 10, which was prepared in Experiment Example 1, an extending portion 19 of the laminate enclosure 11 remains, the extending portion 19 being formed on one side of the wound electrode assembly 12 for the purpose of readily pouring the nonaqueous electrolyte solution. The extending portion 19 is used to analyze gas components produced during charge and discharge, components formed in the nonaqueous electrolyte solution, or the like. In order to obtain a product nonaqueous electrolyte secondary battery, a position along the line A-A in FIG. 2 may be heat-sealed.

Experiment Example 2

A nonaqueous electrolyte secondary battery was prepared in substantially the same manner as that described in Experiment Example 1 except that when negative electrode mixture slurry (2) was prepared, 95 mass parts of the graphite powder, 5 mass parts of $SiO_x$ (x=1) having the carbon coating layer, 1 mass part of carboxymethylcellulose (CMC) corresponding to the binding agent B, water, and 2 mass parts of carbon black serving as a conductive agent were mixed together and the mixture was mixed with 0.5 mass parts of styrene-butadiene rubber (SBR) corresponding to the binding agent A and water. The battery prepared as described above is hereinafter referred to as Battery A2.

Experiment Example 3

When negative electrode mixture slurry (1) was prepared, 95 mass parts of a graphite powder, 5 mass parts of $SiO_x$ (x=1) having a carbon coating layer, 1 mass part of carboxymethylcellulose (CMC) corresponding to a binding agent B, water, and 1 mass part of carbon black serving as a conductive agent were mixed together. The mixture was mixed with 1.5 mass parts of styrene-butadiene rubber (SBR) corresponding to a binding agent A and water.

When negative electrode mixture slurry (2) was prepared, 95 mass parts of the graphite powder, 5 mass parts of $SiO_x$ (x=1) having the carbon coating layer, 1 mass part of carboxymethylcellulose (CMC) corresponding to the binding agent B, water, and 1 mass part of carbon black serving as a conductive agent were mixed together. The mixture was mixed with 0.5 mass parts of styrene-butadiene rubber (SBR) corresponding to the binding agent A and water.

A nonaqueous electrolyte secondary battery was prepared in substantially the same manner as that described in Experiment Example 1 except that the negative electrode mixture slurry (1) and the negative electrode mixture slurry (2) were used. The battery prepared as described above is hereinafter referred to as Battery A3.

Experiment Example 4

A nonaqueous electrolyte secondary battery was prepared in substantially the same manner as that described in Experiment Example 1 except that when negative electrode mixture slurry (1) was prepared, 95 mass parts of the graphite powder, 5 mass parts of $SiO_x$ (x=1) having the carbon coating layer, 1 mass part of carboxymethylcellulose (CMC) corresponding to the binding agent B, water, and 2 mass parts of carbon black serving as a conductive agent were mixed together and the mixture was mixed with 1.5 mass parts of styrene-butadiene rubber (SBR) corresponding to the binding agent A and water. The battery prepared as described above is hereinafter referred to as Battery A4.

Experiment Example 5

When negative electrode mixture slurry (1) was prepared, 92.5 mass parts of a graphite powder, 7.5 mass parts of $SiO_x$ (x=1) having a carbon coating layer, 1 mass part of carboxymethylcellulose (CMC) corresponding to a binding agent B, water, and 1 mass part of carbon black serving as a conductive agent were mixed together. The mixture was mixed with 1.5 mass parts of styrene-butadiene rubber (SBR) corresponding to a binding agent A and water.

When negative electrode mixture slurry (2) was prepared, 97.5 mass parts of the graphite powder, 2.5 mass parts of $SiO_x$ (x=1) having the carbon coating layer, 1 mass part of carboxymethylcellulose (CMC) corresponding to the binding agent B, water, and 1 mass part of carbon black serving as a conductive agent were mixed together. The mixture was mixed with 0.5 mass parts of styrene-butadiene rubber (SBR) corresponding to the binding agent A and water.

A nonaqueous electrolyte secondary battery was prepared in substantially the same manner as that described in Experiment Example 1 except that the negative electrode mixture slurry (1) and the negative electrode mixture slurry (2) were used. The battery prepared as described above is hereinafter referred to as Battery A5.

Experiment Example 6

When negative electrode mixture slurry (1) was prepared, 92.5 mass parts of a graphite powder, 7.5 mass parts of $SiO_x$ (x=1) having a carbon coating layer, 1 mass part of carboxymethylcellulose (CMC) corresponding to a binding agent B, water, and 2 mass parts of carbon black serving as a conductive agent were mixed together. The mixture was mixed with 1.5 mass parts of styrene-butadiene rubber (SBR) corresponding to a binding agent A and water.

When negative electrode mixture slurry (2) was prepared, 97.5 mass parts of the graphite powder, 2.5 mass parts of $SiO_x$ (x=1) having the carbon coating layer, 1 mass part of carboxymethylcellulose (CMC) corresponding to the binding agent B, and water were mixed together. The mixture was mixed with 0.5 mass parts of styrene-butadiene rubber (SBR) corresponding to the binding agent A and water.

A nonaqueous electrolyte secondary battery was prepared in substantially the same manner as that described in Experiment Example 1 except that the negative electrode mixture slurry (1) and the negative electrode mixture slurry (2) were used. The battery prepared as described above is hereinafter referred to as Battery A6.

(Experiments)
[Cycle Characteristic Test]
[Calculation of Capacity Retention]

Batteries A1 to A6 were charged and discharged at a temperature of 25° C. under conditions below, followed by determining the 150th-cycle capacity retention by Equation (1) below. Results are shown in Table 1.
(Charge and Discharge Conditions)
Initial Charge and Discharge Conditions Constant-current charge was performed at a current of 0.5 lt (625 mA) until the voltage of each battery reached 4.2 V. Furthermore, constant-voltage charge at a voltage of 4.2 V until the current reached 0.02 lt (25 mA). Thereafter, constant-current discharge was performed at a current of 0.5 lt (625 mA) until the battery voltage reached 2.5 V.

Second- to 200th-Cycle Charge and Discharge Conditions

Constant-current charge was performed at a current of 0.3 lt (375 mA) until the battery voltage reached 4.2 V. Furthermore, constant-voltage charge at a voltage of 4.2 V until the current reached 0.02 lt (25 mA). Thereafter, constant-current discharge was performed at a current of 0.5 lt (625 mA) until the battery voltage reached 2.5 V.
(Equation for Calculating 150th-Cycle Capacity Retention)

$$\text{Capacity retention}(\%) = (150\text{th-cycle discharge capacity/fourth-cycle discharge capacity}) \times 100 \quad (1)$$

(Power Characteristic Test)
[Calculation of Rate of Increase in DCIR]

After being charged and discharged as described above, Batteries A1 to A6 were charged and discharged under conditions below and the value of the initial direct-current internal resistance (DCIR) given by Equation (2) below was investigated. Furthermore, after the 200th-cycle charge and discharge, charge and discharge were performed under conditions below and the value of the 200th-cycle direct-current internal resistance (DCIR) was determined by Equation (2).
(Charge and Discharge Conditions)

Constant-current charge was performed at a temperature of 25° C. and a current of 0.3 lt (375 mA) until the voltage of each battery reached 3.79 V. Furthermore, constant-voltage charge at a voltage of 3.79 V until the current reached 0.02 lt (25 mA). After a rest was taken for 2 hours, discharge was performed at a current of 0.2 lt (250 mA) for 10 seconds.
(Equation for Calculating DCIR)

$$\text{Resistance}(m\Omega) = (\text{voltage immediately before start of discharge} - \text{voltage after 10 seconds from start of discharge})/(\text{discharge current density} \times \text{electrode area}) \quad (2)$$

The rate of increase in DCIR was determined from the initial resistance and the 200th-cycle resistance by Equation (3) below. Results are shown in Table 1.
(Equation for Calculating Rate of Increase in DCIR after 200 Cycles)

$$\text{Rate of increase in DCIR}(\%) = ((200\text{th-cycle resistance} - \text{initial resistance})/\text{initial resistance}) \times 100 \quad (3)$$

[Abundance Ratio of SBR]

Negative electrode plates of Batteries A1 to A6 were analyzed for condition. In each negative electrode plate, a cross section was prepared with a cross section polisher (manufactured by JEOL Ltd.). The cross section was observed with a scanning electron microscope (SEM), whereby a 500× magnification image was obtained. Next, the cross section was dyed with osmium tetroxide, the content of a binding agent A (SBR) in each of a surface-side region and current collector-side region obtained by halving a negative electrode mixture layer in a thickness direction of the negative electrode mixture layer was determined in the same area using an energy dispersive X-ray spectrometer (abbreviated as EDX or EDS), and the abundance ratio of the binding agent A to the whole of the negative electrode mixture layer was calculated. Results are shown in Table 1.

TABLE 1

| Batteries | Amount of mixed silicon-containing material (mass percent) | | Amount of added conductive agent (mass percent) | | Abundance ratio of binding agent (%) | | Capacity retention (%) | Rate of increase in DCIR (%) |
|---|---|---|---|---|---|---|---|---|
| | Surface side | Current collector side | Surface side | Current collector side | Surface side | Current collector side | | |
| A1 | 5 | 5 | — | — | 39.8 | 60.2 | 89.2 | 9.2 |
| A2 | 5 | 5 | 2 | — | 46.1 | 53.9 | 88.0 | 21.7 |
| A3 | 5 | 5 | 1 | 1 | 38.4 | 61.6 | 89.6 | 12.8 |

TABLE 1-continued

| Batteries | Amount of mixed silicon-containing material (mass percent) | | Amount of added conductive agent (mass percent) | | Abundance ratio of binding agent (%) | | Capacity retention (%) | Rate of increase in DCIR (%) |
| --- | --- | --- | --- | --- | --- | --- | --- | --- |
| | Surface side | Current collector side | Surface side | Current collector side | Surface side | Current collector side | | |
| A4 | 5 | 5 | — | 2 | 35.4 | 64.6 | 90.1 | 6.2 |
| A5 | 2.5 | 7.5 | 1 | 1 | 35.5 | 64.5 | 89.3 | 11.7 |
| A6 | 2.5 | 7.5 | — | 2 | 33.3 | 66.7 | 90.3 | 4.7 |

As is clear from Table 1, Batteries A4 and A6, in which the conductive agent was added to the current collector side only, have higher capacity retention and more excellent cycle characteristics as compared to Battery A1, in which no conductive agent was added, Battery A2, in which the conductive agent was added to the surface side only, and Batteries A3 and A5, in which an equal amount of the conductive agent was added to the surface side and current collector side. In addition, Batteries A4 and A6 have a smaller rate of increase in DCIR and more excellent power characteristics after cycles as compared to Batteries A1 to A3 and A5.

In a comparison between Batteries A4 and A6, in which the conductive agent was added to the current collector side only, Battery A6, in which a larger amount of a silicon-containing material was mixed on the current collector side rather than the surface side, exhibits higher capacity retention and a smaller rate of increase in DCIR as compared to Battery A4, in which an equal amount of the silicon-containing material was mixed on the surface side and the current collector side. As is clear from this, a larger amount of the silicon-containing material, as well as the conductive agent, is preferably mixed on the current collector side rather than the surface side.

Battery A2, in which the conductive agent was added to the surface side only, has lower capacity retention and a significantly larger rate of increase in DCIR as compared to Battery A1, in which no conductive agent was added. Batteries A3 and A5, in which an equal amount of the conductive agent was added to the surface side and current collector side, has increased capacity retention and a larger rate of increase in DCIR as compared to Battery A1, in which no conductive agent was added.

The reason why these results were obtained is unclear and is probably as described below. In Batteries A4 and A6, the amounts of the conductive agent and binding agent A placed on the surface side are small and the amounts of the conductive agent and binding agent A placed on the current collector side are large. In Batteries A4 and A6, larger amounts of the conductive agent and binding agent A placed on the current collector side are intertwined with each other and are dispersed and therefore a phenomenon that the binding agent A migrates to the surface side during application and drying is suppressed. Holding the binding agent A, which has liquid-holding ability, on the current collector side increases the performance of holding the electrolyte solution, which is likely to be short on the current collector side. Therefore, the migration of lithium ions is probably smooth on the current collector side. In Batteries A4 and A6, the amounts of the conductive agent and binding agent A placed on the surface side are small and therefore the permeability of the electrode assembly is high in a thickness direction of an electrode; hence, the migration of lithium ions is probably smooth in the thickness direction of the electrode. Furthermore, in Batteries A4 and A6, larger amounts of the conductive agent and binding agent A placed on the current collector side are intertwined with each other and are dispersed and therefore the migration of electrons is smooth on the current collector side; hence, current collection properties are probably improved.

The increase of electronic conductivity (the migration of electrons) on the current collector side and the increase of ionic diffusivity (the migration of lithium ions) in the electrode as described above equalize the charge/discharge reaction of the negative electrode active material on the surface side and the current collector side, that is, the charge/discharge reaction of the negative electrode active material in the whole electrode, whereby higher capacity retention is obtained as compared to other batteries. This probably results in the enhancement of cycle characteristics.

In addition, in Batteries A4 and A6, since the charge/discharge reaction of the negative electrode active material is equalized in the whole electrode as described above and the amount of the conductive agent placed on the surface side is small, a side reaction between the conductive agent and the electrolyte solution is suppressed on the electrode surface side and therefore the increase of the rate of increase in DCIR is suppressed as compared to other batteries. This probably results in the enhancement of power characteristics after cycles.

In Battery A1, the amount of binding agent A is small on the surface side and is large on the current collector side and no conductive agent is contained. In Battery A1, since no conductive agent is contained in an electrode, the binding agent A agglomerates on the current collector side to serve as a resistor; hence, electronic conductivity is inhibited on the current collector side and current collection properties are reduced. The phenomenon that the binding agent A, which has liquid-holding ability, migrates to the surface side during application and drying cannot be suppressed. Therefore, the performance of holding the electrolyte solution on the current collector side is reduced and ionic diffusivity is inhibited on the current collector side. These inhibit the electronic conductivity and ionic diffusivity in the electrode and therefore the charge/discharge reaction of the negative electrode active material in the whole electrode is probably more uneven as compared to Batteries A4 and A6. This probably exhibits lower capacity retention and a larger rate of increase in DCIR as compared to Batteries A4 and A6.

In Battery A2, the amount of the binding agent A is small on the surface side and is large on the current collector side and a larger amount of the conductive agent is placed on the surface side. In Battery A2, since a larger amount of the conductive agent is placed on the surface side, no effect due to the increase of electronic conductivity and ionic conductivity is obtained because of the reason described for Battery A1. In addition, in Battery A2, a larger amount of the conductive agent placed on the surface side accelerates the phenomenon that the binding agent A migrates to the surface side. Therefore, it is clear that the amount of the binding agent present on the current collector side is smaller as compared to Battery A1. The reduction in amount of the binding agent present on the current collector side reduces the permeability of the electrolyte solution in a thickness direction of an electrode and therefore the ionic diffusivity in the thickness direction of the electrode is reduced. This makes the charge/discharge reaction of the negative electrode active material in the whole electrode more uneven as compared to Battery A1. Therefore, it is conceivable that the capacity retention is smaller and the rate of increase in DCIR is larger as compared to Battery A1. Furthermore, in Battery A2, since a larger amount of the conductive agent is placed on the surface side, a side reaction between the conductive agent and electrolyte solution placed on the surface side occurs to cause an increase in resistance. Therefore, it is conceivable that the rate of increase in DCIR is significantly larger as compared to Battery A1.

In Batteries A3 and A5, the amount of the binding agent A is small on the surface side and is large on the current collector side and an equal amount of the conductive agent is placed on the surface side and the current collector side. In Batteries A3 and A5, the conductive agent and binding agent A placed on the current collector side increase the electronic conductivity and the ionic diffusivity on the current collector side. However, since an equal amount of the conductive agent is placed on the surface side and the current collector side, the permeability of the electrolyte solution in a thickness direction of an electrode is reduced and the ionic diffusivity in the thickness direction of the electrode is inhibited. These probably allow the charge/discharge reaction of the negative electrode active material in the whole electrode to be more even as compared to Battery A1 and more uneven as compared to Batteries A4 and A6. Thus, the capacity retention is higher than that of Battery A1 and is lower than that of Batteries A4 and A6. On the other hand, the rate of increase in DCIR is larger as compared to Batteries A1, A4, and A6. This is probably because, in Batteries A3 and A5, the conductive agent is placed on the current collector side and therefore a side reaction between the conductive agent and electrolyte solution placed on the surface side occurs to cause an increase in resistance.

The invention claimed is:

1. A negative electrode for nonaqueous electrolyte secondary batteries, comprising a negative electrode current collector and a negative electrode mixture layer placed on the negative electrode current collector,
wherein the negative electrode mixture layer is a layer of a mixture of a negative electrode active material, a binding agent, and a conductive agent; the binding agent includes a binding agent A made of a rubber polymeric compound and a binding agent B made of a water-soluble polymeric compound; and in the case where a through-thickness cross section of the negative electrode mixture layer is halved into a current collector-side region and a surface-side region, the amount of the binding agent A in the current collector-side region and the amount of the conductive agent in the current collector-side region are larger than the amount of the binding agent A in the surface-side region and the amount of the conductive agent in the surface-side region, respectively,
wherein the amount of the conductive agent in the current collector side region is 100% by mass of the amount of the conductive agent contained in the negative electrode mixture layer.

2. The negative electrode for nonaqueous electrolyte secondary batteries according to claim 1, wherein the negative electrode active material contains silicon.

3. The negative electrode for nonaqueous electrolyte secondary batteries according to claim 1, wherein the negative electrode active material contains a silicon oxide, where the atomic ratio x of oxygen to the total amount of Si is given by $0.5 \leq x \leq 1.5$.

4. The negative electrode for nonaqueous electrolyte secondary batteries according to claim 3, wherein the silicon oxide is surface-coated with carbon.

5. The negative electrode for nonaqueous electrolyte secondary batteries according to claim 1, wherein an amount of silicon contained in the current collector-side region is 50% to 100% by mass of the amount of silicon contained in the negative electrode mixture layer.

6. The negative electrode for nonaqueous electrolyte secondary batteries according to claim 1, wherein the content of the conductive agent in the negative electrode mixture layer is 0.1% to 20% by mass.

7. The negative electrode for nonaqueous electrolyte secondary batteries according to claim 1, wherein the amount of the binding agent A contained in the current collector-side region is 50% to 70% of the amount of the binding agent A contained in the negative electrode mixture layer.

8. The negative electrode for nonaqueous electrolyte secondary batteries according to claim 1, wherein the negative electrode active material further contains a carbon material.

9. The negative electrode for nonaqueous electrolyte secondary batteries according to claim 5, wherein the amount of silicon contained in the current collector-side region is 100% by mass of the amount of silicon contained in the negative electrode mixture layer.

10. A negative electrode for nonaqueous electrolyte secondary batteries, comprising a negative electrode current collector and a negative electrode mixture layer placed on the negative electrode current collector,
wherein the negative electrode mixture layer is a layer of a mixture of a negative electrode active material, a binding agent, and a conductive agent; the binding agent includes a binding agent A made of a rubber polymeric compound and a binding agent B made of a water-soluble polymeric compound; and in the case where a through-thickness cross section of the negative electrode mixture layer is halved into a current collector-side region and a surface-side region, the amount of the binding agent A in the current collector-side region and the amount of the conductive agent in the current collector-side region are larger than the amount of the binding agent A in the surface-side region and the amount of the conductive agent in the surface-side region, respectively,
wherein an amount of silicon contained in the current collector-side region is 100% by mass of the amount of silicon contained in the negative electrode mixture layer.

* * * * *